(12) United States Patent
Tsidon et al.

(10) Patent No.: US 12,216,921 B1
(45) Date of Patent: Feb. 4, 2025

(54) SECURE MONITORS FOR MEMORY PAGE PROTECTION (71) Applicant: Amazon Technologies, Inc., Seattle, WA (US)

(72) Inventors: Erez Tsidon, Moreshet (IL); Ori Cohen, Atlit (IL); Barak Wasserstrom, Mizpe Aviv (IL); Andrew Robert Sinton, Jerusalem (IL); Asaf Modelevsky, Mizra (IL); Moshe Raz, Pardesiya (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,489

(22) Filed: Mar. 31, 2022

(51) Int. Cl.
*G06F 3/06* (2006.01)

(52) U.S. Cl.
CPC ............ *G06F 3/062* (2013.01); *G06F 3/0653* (2013.01); *G06F 3/0679* (2013.01)

(58) Field of Classification Search
CPC ........... G06F 2212/68; G06F 2212/681; G06F 2212/1052; G06F 12/1009; G06F 12/1027; G06F 12/145; G06F 12/1483; G06F 12/0868; G06F 12/0882; G06F 12/1475; G06F 21/50; G06F 21/53; G06F 21/554; G06F 21/566; G06F 9/45558; G06F 2009/45583; G06F 2009/45587; G06F 2009/45533; G06F 3/0679; G06F 3/0653; G06F 3/062
See application file for complete search history.

(56) References Cited

U.S. PATENT DOCUMENTS

| | | | | |
|---|---|---|---|---|
| 2011/0004739 A1* | 1/2011 | Hohmuth | ............ | G06F 12/1027 711/E12.001 |
| 2016/0117229 A1* | 4/2016 | Epstein | ............... | G06F 11/2058 714/6.23 |
| 2019/0102547 A1* | 4/2019 | Aktas | ....................... | G06F 21/56 |
| 2019/0155630 A1* | 5/2019 | Zhu | ..................... | G06F 9/30076 |
| 2022/0382684 A1* | 12/2022 | Durham | .............. | G06F 12/1027 |

* cited by examiner

Primary Examiner — Curtis James Kortman
(74) Attorney, Agent, or Firm — Klarquist Sparkman, LLP (57) ABSTRACT

Technologies are disclosed for using hardware-embedded monitors to monitor pages of local memory and detect attribute violations or other unauthorized operations relating to the memory. The attribute violations may include mismatches of attributes (e.g., designating a page as writeable versus executable or vice versa) in entries in a translation buffer that point to a same physical address or other mismatches between designations of attributes for a page in physical and virtual space. Responsive to detecting a violation, an alert or other mitigation protocol, which may include an audit of activities surrounding the violation, may be performed.

19 Claims, 9 Drawing Sheets

SECURE MONITORS FOR MEMORY PAGE PROTECTION

BACKGROUND

Applications stored in memory devices of hardware computing components, such as network interface controllers or other devices, may include data, such as computer-readable instructions, configured to be executable to perform operations associated with the application. The data may be stored as pages in the memory devices, where the pages have attributes including a designation of the page as readable, writeable, or executable. When set to readable, the data in the page may be read by other devices; when set to writeable, the data in the page may be altered; and when set to executable, the data in the page may be executed to perform associated operations using the hardware computing components.

DETAILED DESCRIPTION

In order to protect hardware computing components from being altered by unauthorized sources to execute unauthorized programming instructions, some approaches may include monitoring for unexpected operations of the computing components. However, in some examples, executing unauthorized programming instructions may cause operations of computing components that are not immediately recognized as being unexpected (e.g., the unauthorized alteration may only produce unexpected results in certain conditions, which are not immediately encountered) or that appear to be in line with expected operations. Accordingly, such reliance on detecting the effect of unauthorized changes to programming instructions may provide inaccurate or untimely indications of security breaches. Another approach may include monitoring all traffic sent on various communication channels within and/or between hardware computing components. However, this approach may be exceedingly resource-intensive, and may generate an overwhelming number of false-positive indications of unexpected behavior due to frequent movement and/or updating of data in memory locations during some operating states of the hardware computing components.

The present disclosure provides approaches to protect hardware computing components, such as hardware computing chips, from being utilized by unauthorized entities that attempt to run unauthorized programming code that, if left undetected, could potentially place security assets relating to the hardware computing components at risk. The disclosed approaches include systems and methods that target on-chip systems that have periods of stability in which functionality of the systems experiences no or minimal changes. For example, at boot time, applications may be loaded into memory devices of the hardware computing components, after which the applications may remain relatively unaltered unless a specified exception occurs (e.g., an update event). According to some examples of the present disclosure, the state of the memory may be frozen after boot time (e.g., after all service applications are loaded and before the hardware interfaces are opened to other parties such as clients that utilize the functionality of the hardware computing components).

During the above-described time window, hardware-embedded monitors may record all of the executable pages (or pages that may be set to executable) in the memory and start monitoring memory regions of these pages to ensure no changes are made to the data in the executable pages. For example, the hardware monitors may monitor for changes to attributes of the pages, such as changes from readable/writeable to executable and/or from executable to readable/writeable. Responsive to detecting a violation condition (e.g., the unauthorized change in attributes, or other unexpected changes to the memory), the hardware monitors may generate a secure interrupt to secure software to allow the secure software to issue an alert and/or take other mitigating actions (e.g., putting the system in quarantine, etc.). The disclosure also provides mechanisms to allow for auditing violations after detection in order to determine factors that enabled the unauthorized access to the memory. The above-described and additional features of hardware-based protection of computing systems are described in more detail below and with reference to the associated figures of this disclosure.

Figure 1:
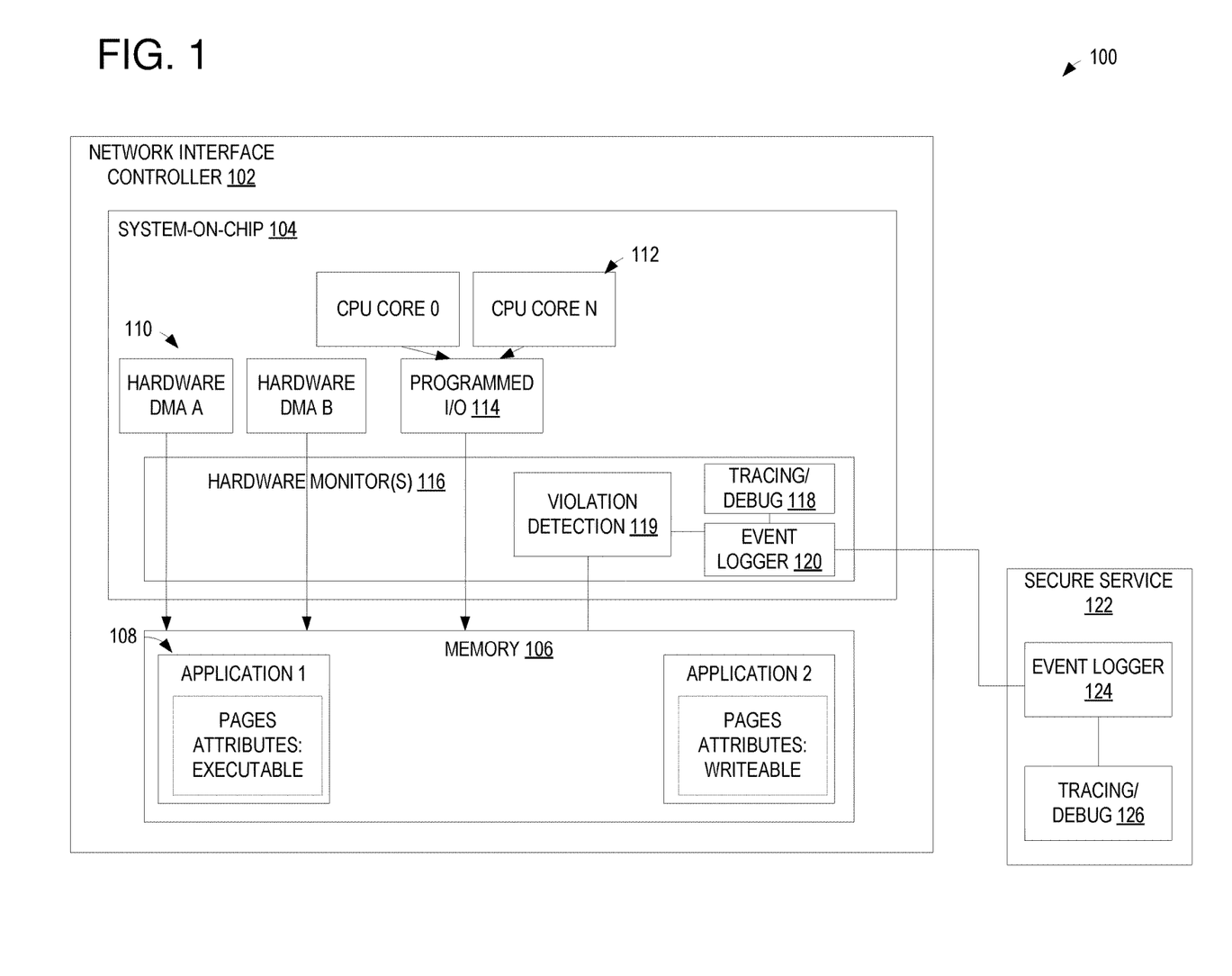
FIG. 1 shows an example system for hardware-embedded monitoring of pages in a memory.

FIG. 1 shows an example computing system 100 that includes hardware-embedded monitors configured to detect unauthorized or unexpected changes in memory in order to protect executable pages of applications loaded on the computing system. In the illustrated example, the system includes a network interface controller (NIC) 102 for illustrative purposes, however, it is to be understood that the disclosed systems and methods may be applied in other computing environments in an analogous manner. For example, similar components to those included in the NIC 102 may be included in a server computer or other computing system environment to provide the disclosed hardware-based monitoring of memory changes without departing from the scope of this disclosure.

The NIC 102 includes a System-on-Chip (SoC) 104 (or other integrated circuit) and memory 106. The memory 106 is configured to store data, including instructions executable to perform operations associated with one or more applications 108. In the illustrated example, the memory 106 includes instructions and/or data for two applications (Application 1 and Application 2), however, it is to be understood that additional or fewer applications may be stored in memory 106 in other examples, and applications 108 may be updated, added to, or removed from memory 106 over time.

In some examples, the memory 106 includes one or more dynamic random-access memory (DRAM) chips included in the NIC 102 and in communication with the SoC 104. The memory 106 may be divided into pages, where each page has its own attributes (e.g., indicating that the page is readable, writeable, or executable). Typically, when a page has an attribute setting of executable, it is not writeable. However, the attribute of the page may be temporarily changed to writeable in order to allow data to be loaded into the page, after which the attribute of the page is changed back to executable in order to execute the newly-loaded data (e.g., to run an associated program). For purposes of illustration, the example of FIG. 1 shows that application 1 includes data stored in pages having an attribute set to "executable," and application 2 includes data stored in pages having an attribute set to "writeable."

The SoC 104 includes various processing components, including hardware direct memory access engines (DMAs) 110 and central processing unit (CPU) cores 112, configured to interact with memory 106 in order to read/write data and/or execute data, such as data in executable pages of the applications 108, to perform operations associated with the NIC 102 (or other computing system, in examples where the processing components/memory are included in a server or other system). For example, the applications 108 may include instructions executable by the processing components of the SoC to control how the NIC 102 connects an associated computer (e.g., that includes the NIC 102) to a computer network and/or how the NIC 102 processes data received from the computer network.

In the illustrated example, the SoC 104 includes two DMAs 110 (DMA A and DMA B) and two CPU cores 112 (CPU Core 0 and CPU Core N), however, it is to be understood that additional or fewer processing components may be included in the SoC 104 in other examples of the disclosed system. CPU cores 112 may include different cores of the same processor and/or cores of multiple processors in examples of the present disclosure. As shown, the DMAs 110 are configured to access the memory 106 substantially directly (e.g., without involving the CPU cores), whereas the CPU cores 112 access the memory 106 via a programmed input/output (I/O) unit 114. The programmed I/O unit 114 may include a memory-mapped I/O (MMIO) or a port-mapped I/O (PMIO). In the example of a PMIO, data transfers are made using a special address space outside of normal memory, which may be accessed with dedicated instructions. In the example of a MMIO, data transfers may be mapped into the normal address space available to the program.

In typical systems, there may be challenges to tracking memory alterations, because places where pages for applications are stored may be moved throughout a memory device. However, in some systems, such as the illustrated NIC 102, a device may be configured to run a specified number of tasks, so the applications for running these tasks are loaded into memory of the device and are not changed unless there is a special event or update condition. The disclosed approach may leverage this timeline of memory stability in some examples by building a side system on the hardware itself, where the control of the system is performed with a secure entity in software. For example, as described above, the disclosed systems and methods utilize one or more hardware monitor(s) 116 to monitor traffic sent between the DMAs 110/CPU cores 112 and the memory 106 and/or other memory operations in order to provide early detection of unauthorized changes or requests for changes to the executable pages of applications 108 and/or other memory regions. For example, the hardware monitors 116 may include a violation detection component 119 comprising one or more engines or other components for performing one or more monitoring operations, such as monitoring translation buffers of CPUs for mismatches in attributes, measuring executable pages requested to be loaded into memory and comparing the measurements to known allowed pages for the memory, and/or other monitoring operations. Examples of the monitoring operations performed by violation detection component 119 are described in more detail below. The hardware monitors 116 are embedded on the SoC 104 (e.g., part of the circuitry of the chip) in order to provide increased security and more direct monitoring compared to external monitoring components.

Before running any clients, such as virtual machines or other computing services/programs, on servers, the locations of existing executable and non-executable pages may be marked respectively. Once service for the clients is started, the hardware monitors 116 may monitor whether an attempt is made to write to an executable page (e.g., by changing an attribute of the page to writeable, where the attempt may originate from any hardware module that issues a write command to a physical address of page) or whether an attempt is made to change an attribute of a readable/writeable page to executable. For example, the hardware monitors 116 may look at all traffic between the DMAs 110/CPU cores 112 (including traffic passed through programmed I/O 114) and the memory 106, and for each and every transaction look for a violation. For example, a violation may include an unauthorized or unexpected change in the attribute or attempt/instruction to change the attribute, based on the marking of the pages described above, and/or a conflict between an attribute designation in physical or virtual address references for the page used by the CPU cores, as described in more detail below with respect to FIG. 3.

In some examples, the hardware monitors 116 may be positioned in hardware at a location that allows for the monitoring of fetches of pages from the memory 106 to the cache of the CPU cores 112 and/or DMAs 110. The fetching and/or any subsequent requests to change an attribute of a selected page may be checked against a list of targeted pages to determine whether the execution of that selected page is allowed. The list of targeted pages may be supplied by an external service and/or generated as a result of executing subroutines of the hardware monitors that examine page states prior to monitoring and/or after authorized updates to respectively mark memory locations as storing executable or readable/writeable pages. The list may be stored in memory local to the hardware monitors 116, in the secure service 122, and/or in a location that is otherwise accessible to the hardware monitors. In some examples, the violation detection component 119 may include a page measurement service, which may include instructions to measure the pages in memory 106. For example, the page measurement service may be triggered to measure a targeted page (e.g., calculate a hash value, by applying a hashing algorithm such as SHA-256, to the data of the targeted page) responsive to determining that the targeted page has changed from readable or writeable to executable. The result of the measurement from page measurement service may be saved locally and/or at the secure service 122, and may be compared to the list of allowed measurements of executable pages to determine if the content of the measured page that has been changed to executable conflicts with the expected content of the measured page. In some examples, the list of allowed measurements of executable pages (e.g., list of allowed pages) may be updated responsive to a request from a secure source to add, remove, or change a hash in the list. For example, the request may be determined to be from a secure source when the request and/or the requested change is signed with an approved signature; otherwise, if the request is not determined to be from a secure source (e.g., not signed with an approved signature), the request may be ignored and the requested changes to the list may not be made. The hardware monitors 116 may include a tracing and/or debugging unit 118 and an event logger 120, configured to track the traffic and store information relating to the tracked traffic, respectively.

The above-described monitoring may result in the detection of violation conditions, such as detections of unauthorized changes in memory and/or page attributes. Responsive to detection of a violation condition, the hardware monitors 116 may be configured to generate a secure alarm (e.g., an alarm to be sent to a secure service, such as service 122) and/or to perform other mitigation operations, such as quarantining the system 100 and/or components of the system (e.g., the NIC 102, regions of the memory 106, etc.). The secure service 122 may include an event logger 124 and tracing and/or debugging unit 126, which may generally be configured similarly to event logger 120 and tracing and/or debugging unit 118, respectively. The secure service 122 may provide a mechanism to perform additional or alternative mitigation processes for the violation condition, such as generating tickets for administrative review, performing additional processing (e.g., auditing) to determine root causes of the violation condition (described in more detail below with respect to FIG. 3), and/or to verify whether the violation condition is valid (e.g., whether the unauthorized change was from a compromised source).

Figure 2:
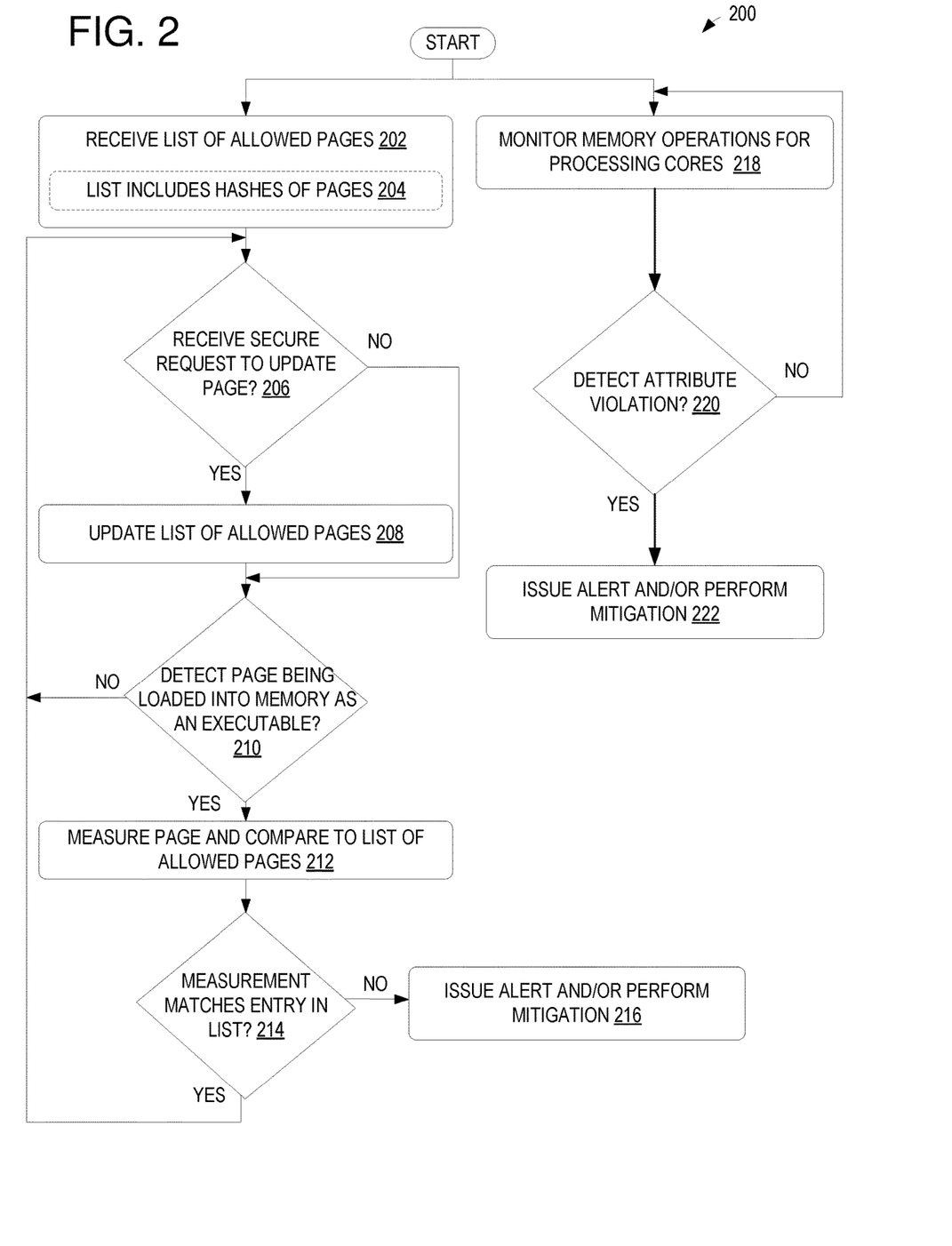
FIG. 2 is a flow chart of an example method for using hardware-embedded monitors to protect pages in a memory.

FIG. 2 is a flow chart of an example method 200 for using hardware-based secure monitors to protect executable pages stored in memory. For example, method 200 may be performed by the hardware monitors 116 of FIG. 1 (and/or hardware monitor(s) 316 described below with respect to FIG. 3) to monitor traffic between processing components (e.g., DMAs 110 and CPU cores 112 of FIG. 1) and a memory (e.g., memory 106 of FIG. 1) for unauthorized changes to the memory. At 202, the method includes receiving a list of allowed pages. For example, the list of allowed pages may include hashes of the pages, as indicated at 204 (e.g., data from the pages being hashed with a hashing algorithm, such as a SHA-256 algorithm). The list of allowed pages may be generated by a secure service and/or by originating sources of the data for the pages.

At 206, the method includes determining if a secure request to update one or more of the targeted executable pages is received, for example, from a DMA engine or a CPU core. For example, the check at 206 only proceeds to the "YES" branch to update the list of allowed pages, as indicated at 208, if the request is determined to originate from an authorized source (e.g., if the requested is a secured request that has been digitally signed by an authorized entity), such that requests deemed not to be secure or verified result in a failure to update the list and/or a generation of an alert regarding an authorized attempt to update the pages. Although illustrated as a decision block in a particular position of the flow chart, it is to be understood that the check at 206 may be implemented as an interrupt or continuous/regularly recurring check throughout operation in the monitoring state in order to allow a updates to the list when appropriate (e.g., when the pages are requested to be updated by an authorized source).

If a secure request is not received (e.g., "NO" at 206), or after the list of allowed pages is updated in accordance with a secure request, the method includes monitoring traffic from processing cores and/or Direct Memory Access engines (DMAs) to detect whether any page is being loaded into memory as an executable, as indicated at 210. For example, all commands and/or instructions sent from processing cores (e.g., via an interfacing programmable input/output component) to the memory and/or from DMAs to the memory may pass through and/or be inspected by the hardware monitors to determine if the commands/instructions correspond to a change in attribute of one of the executable pages being monitored. If no executable page is detected (e.g., "NO" at 210), the method returns to continue monitoring/selectively updating the list as described above.

If an executable page is detected as being loaded into memory (e.g., "YES" at 210), the method includes measuring the detected executable page and comparing the page to the list of allowed pages, as indicated at 212. For example, the data for the detected executable page may be applied to a hashing algorithm to generate a corresponding hash of the page, which is compared to the hashes in the list of pages received at 202 and/or updated at 208. As indicated at 214, if the measurement of the page (e.g., the hash) matches an entry in the list, the method returns to continue monitoring/selectively updating the list as described above. If the measurement (e.g., the hash) does not match any entry in the list (e.g., "NO" at 214), the method includes issuing an alert and/or performing mitigation, as indicated at 216.

In parallel to the measurement process described above, the hardware monitors may perform additional monitoring. At 218, the method includes monitoring memory operations for processing cores, as indicated at 218. For example, the memory operations may include translations between virtual and physical addresses of pages in memory being accessed by the processing cores. At 220, the method includes determining if an attribute violation is detected. For example, an attribute violation may include a determination of a mismatch between an attribute setting (e.g., writeable/readable versus executable) for a page different virtual and/or physical memory spaces (e.g., where a physical address for a page indicates that the page is writeable or readable, while another corresponding virtual address for the page indicates that the page is executable, or vice versa). If a violation is not detected (e.g., "NO" at 220), the method returns to continue monitoring at 218. If a violation is detected (e.g., "YES" at 220), the method includes issuing an alert and/or performing mitigation, as indicated at 222. For example, the alert may be sent to an event logger on the chip and/or on a control plane. Examples of mitigation that are optionally performed may include intercepting the violating command/instruction and/or not allowing the command/instruction to be issued to the memory (e.g., preventing the requested attribute change from occurring) and/or quarantining the device until the violation is addressed by a centralized security service. For example, quarantining the device may include freezing the memory of the device and/or not allowing one or more executable pages on the device to run, preventing the device from accessing the network, and/or other actions.

In some examples, a different alert/mitigation response is performed for unexpected memory changes (e.g., at 216) relative to detections of attribute violations (e.g., at 222) or other violation conditions. For example, an alert may be issued responsive to attribute violations (e.g., without performing any other mitigation unless further instructions are received from an outside security service) while an alert and mitigation may be performed responsive to unexpected memory changes detected by measuring and comparing pages to an allowed list. In other examples, different types of mitigation may be performed (e.g., quarantining the device versus stopping execution of a particular executable page, etc.) for different violation conditions.

Figure 3:
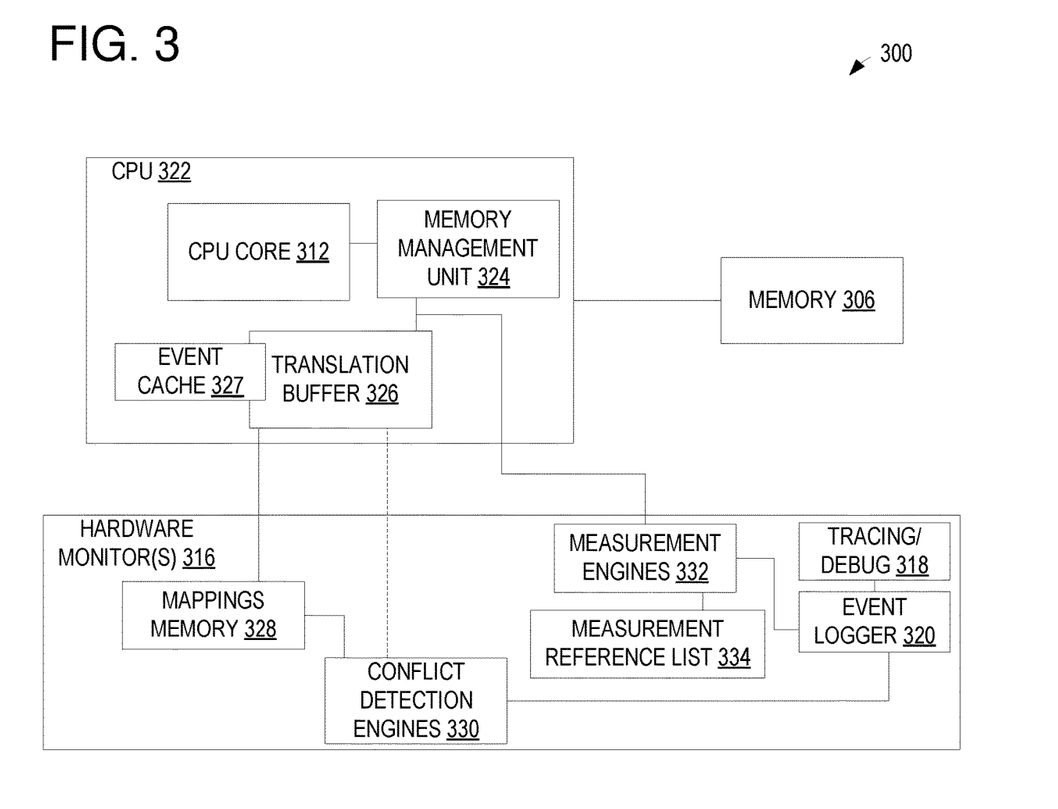
FIG. 3 shows an example system for monitoring a translation buffer in addition to performing page measurements to detect violations relating to executable pages.

FIG. 3 shows an example system 300 for monitoring both page measurements and translation buffers for central processing units (CPUs) to detect violations relating to pages. For example, the components described below (e.g., mappings memory and conflict detection engines used for monitoring translation buffers, and measurement engines and measurement reference list used for performing page measurements) may be examples of elements of the violation component 119 of FIG. 1. The system 300 includes one or more hardware monitors 316 configured to perform measurements and monitoring, including monitoring memory components of CPU 322 that coordinate interactions between CPU core 312 and memory 306. It is to be understood that the CPU core 312, hardware monitor(s) 316 (including tracing/debug 318 and event logger 320) and memory 306 may be configured in accordance with one or more of the features described above with respect to CPU cores 112, hardware monitor(s) 116 (including tracing/debug 118 and event logger 120), and memory 106 of FIG. 1, respectively. The CPU 322 may include a memory management unit (MMU) 324, which maps virtual page numbers (e.g., used by CPU core 312 to perform operations on memory 306) to physical page numbers for memory 306. A translation buffer 326 (e.g., a translation lookaside buffer, TLB) may store or cache translations from virtual to physical page numbers, including indications of attributes of the virtual and physical pages.

As shown in FIG. 3, a mappings memory 328 and conflict detection engines 330 may be used to monitor page attributes to detect violations (e.g., conflicts between attribute settings for pages/page references in different physical/virtual spaces). For example, the contents of the translation buffer 326 may be loaded into mappings memory 328, and a plurality of conflict detection engines 330 may operate in parallel to respectively scan different parts of mappings memory 328 to identify virtual addresses of pages that are mapped to physical addresses of pages having a different attribute. For example, attribute mismatches or other violations may include determining that two entries in one or more translation buffers have virtual addresses that point to the same physical address for a page in the memory and have different designations of attributes (e.g., one entry for a first virtual address of a page designates the page as being writeable while a second entry for a second virtual address of the page designates the page as being executable). In another example of an attribute mismatch, a virtual address references a page marked as writeable in an entry in the translation buffer and a corresponding page referenced by the virtual address is marked as executable in the physical space (e.g., on the memory itself).

It is to be understood that mappings memory 328 may be located in any suitable location local or external to the hardware monitors 316. In some examples, in addition or alternative to using mappings memory 328, one or more of the conflict detection engines 330 may directly access the translation buffer 326 to perform the above-described monitoring and comparisons of page attributes in the virtual and physical spaces. Furthermore, although shown as a single CPU with a single CPU core and MMU/translation buffer, it is to be understood that the above-described monitoring may be performed for all CPUs/CPU cores and associated translation buffers in an SoC. For example, responsive to loading a writeable page in memory 306, all corresponding physical addresses on all translation buffer entries for all CPU cores may be checked to ensure that no CPU core views the physical address as executable (or vice versa for loading an executable page in memory).

The hardware monitor(s) 316 may also include measurement engines 332 and a measurement reference list 334, which collectively may provide a measurement service, such as described above with respect to the violation detection component 119 of FIG. 1. For example, the measurement engines may apply executable pages requested to be loaded into memory 306 to a hash algorithm (e.g., a SHA-256 algorithm) to determine a hash of the loaded page, and compare the hash to the hashes in the measurement reference list 334 (e.g., loaded and/or updated as described above with respect to FIG. 2). If the measurement engines 332 detect a violation (e.g., the hash is not found in the measurement reference list), an indication of the violation may be logged by event logger 320 and/or propagated to a secure service (e.g., as described above with respect to FIG. 1). In some examples, an event cache 327 is included with and/or in communication with the translation buffer 326 and configured to cache a last n transactions of the translation buffer (e.g., where n is a threshold number of transactions that can be stored by the cache). If a page is to be loaded into memory as an executable page, before performing the measurement described above, the page may be checked with the event cache 327 to determine if the same page was already the subject of a translation buffer transaction previously. If the same page is already in the cache and unchanged other than the attribute designation, then the measurement process may be skipped in order to save processing resources by reducing the number of measurements performed on executable page loadings.

Figure 4:
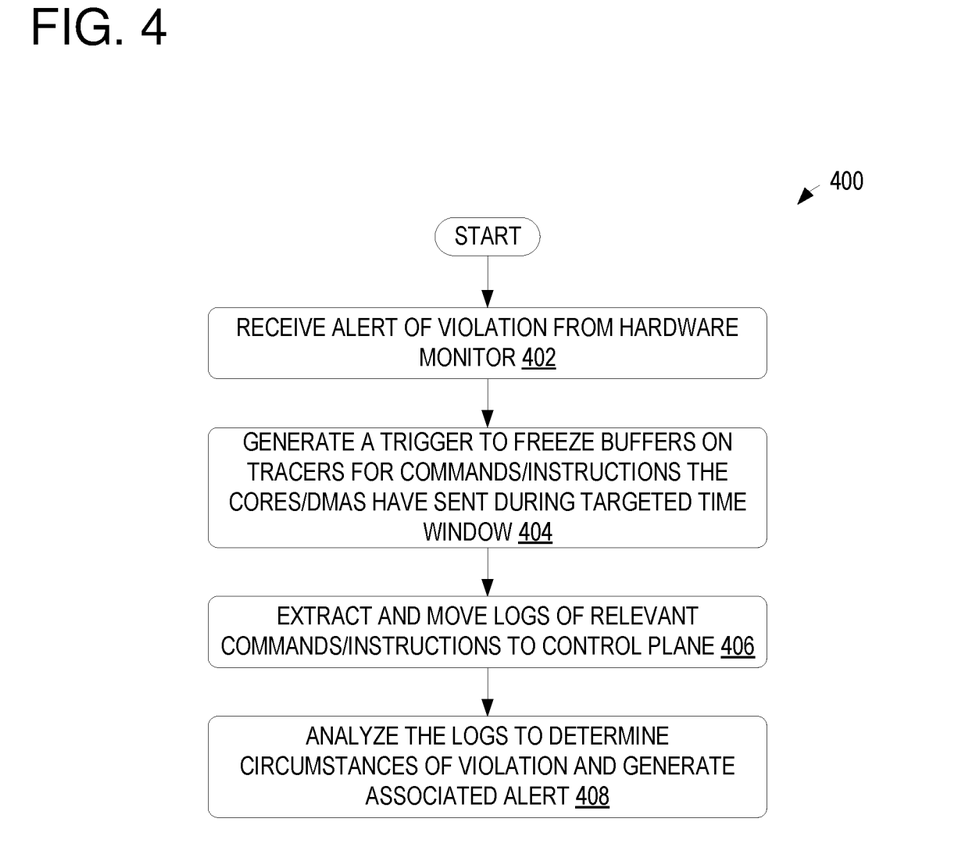
FIG. 4 is a flow chart of an example method for auditing detected violation conditions associated with pages in a memory.

FIG. 4 is a flow chart of an example method 400 for performing an audit on a hardware component responsive to detection of a violation associated with executable pages in memory of the hardware component. For example, method 400 may be performed by a centralized security service (e.g., secure service 122 of FIG. 1) coupled to hardware monitors (e.g., hardware monitors 116 of FIG. 1) embedded on the hardware component (e.g., NIC 102 of FIG. 1). At 402, the method includes receiving an alert of a violation from a hardware monitor. For example, the alert may be responsive to a change in attribute of an executable page, as described above at 210 of FIG. 2, an unauthorized/unexpected change in memory, as described above at 226 of FIG. 2, and/or another violation detected by the hardware monitor.

At 404, the method includes generating a trigger to freeze buffers on tracers corresponding to the hardware component for commands and/or instructions that processing cores and/or DMAs of the hardware component have sent during a targeted time window. For example, as described above with respect to FIG. 1, for each processor and/or processing core/DMA on the hardware component, a tracer may be deployed, which traces each and every command or instruction that core/DMA is executing. In some examples, the tracer is also used for debugging. In the illustrated method, the logs generated by the tracer are used to evaluate and determine a cause of the violation.

At 406, the method includes extracting and moving logs of relevant commands and/or instructions to a control plane for further review. For example, the relevant commands and/or instructions may include those resulting in an unexpected change to the memory/attributes and/or commands/instructions issued within a threshold time of the commands/instructions that resulted in the unexpected change. Freezing the logs may include securing the logs such that only a secure entity on the hardware component, such as the hardware monitor, is able to access the logs to extract the relevant data for transfer to the control plane.

At 408, the method includes analyzing the logs to determine circumstances of the violation and generating an associated alert. For example, the alert may include a notice to a security service and/or entity indicating a vulnerability that allowed the unexpected change to memory to be made.

Figure 5:
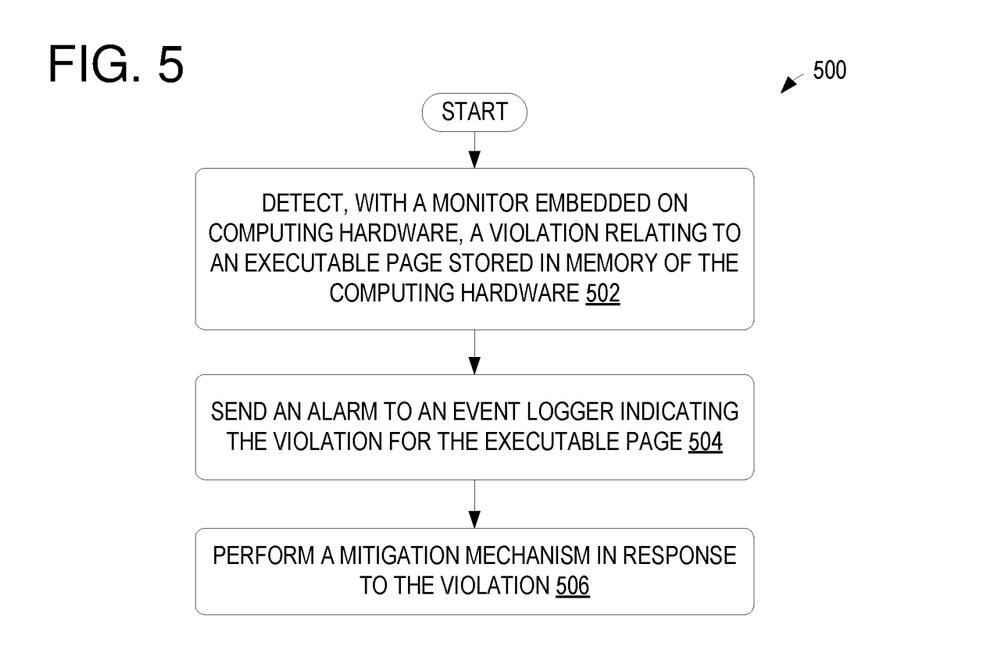
FIG. 5 is a flow chart of an example method for protecting pages in a memory via hardware-based monitoring.

FIG. 5 is a flow chart of an example method 500 for protecting executable pages using embedded hardware monitors. At 502, the method includes detecting, with a monitor embedded on computing hardware, a violation relating to an executable page stored in memory of the computing hardware. For example, method 500 may be performed by one or more hardware monitors, such as hardware monitors 116 of FIG. 1 and/or hardware monitors 316 of FIG. 3, to detect unauthorized changes (or requests for changes) to pages of a memory device (e.g., memory 106 of FIG. 1 and/or memory 306 of FIG. 3) and/or mismatches between attribute designations for references to the pages in different physical/virtual memory spaces.

At 504, the method includes sending an alarm to an event logger indicating the violation for the executable page. For example, as described above with respect to FIG. 1, an alarm may be sent to a secure service (e.g., secure service 122) and/or another component on a control plane that provides centralized security services for a network to which the computing hardware is connected. At 506, the method includes performing a mitigation mechanism in response to the violation. For example, the mitigation mechanism may include quarantining the system, generating a user-readable alert for presentation (e.g., display) via a user interface (e.g., a graphical user interface) of a computing system usable by an administrator or other custodian of the system, performing an audit (e.g., as described above with respect to FIG. 4) to determine details of the violation and/or address conditions that enabled the violation to occur, etc.

Figure 8:
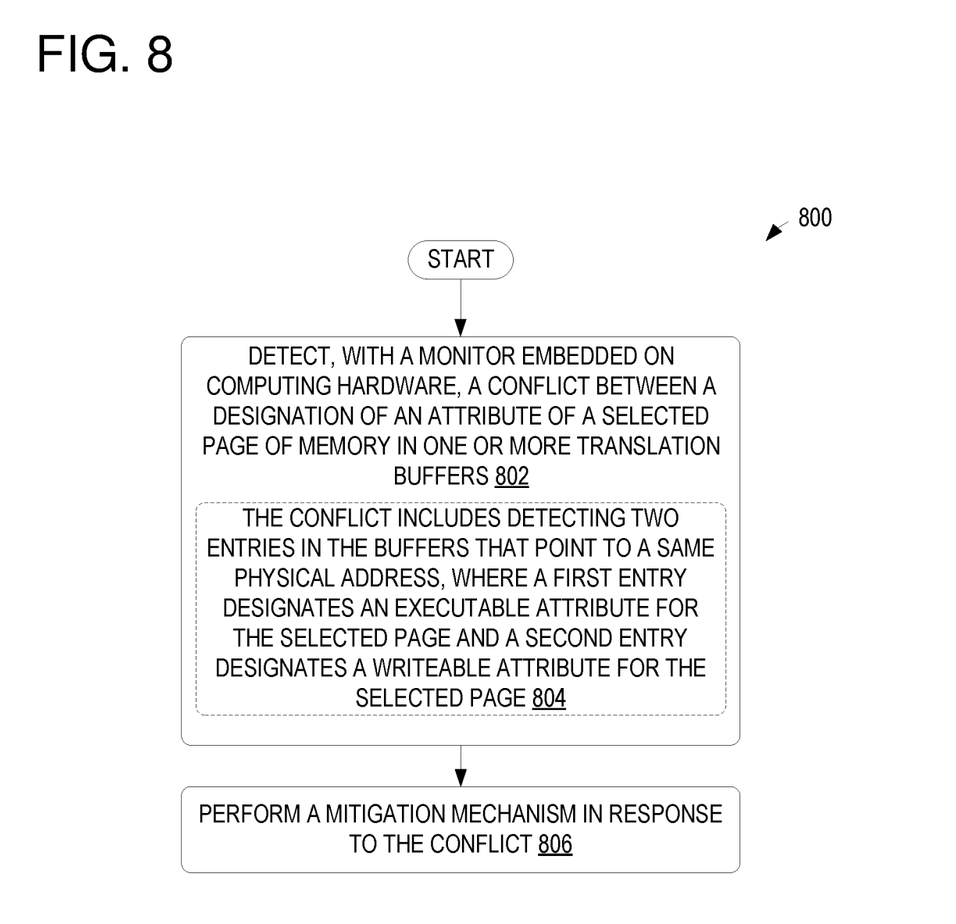
FIG. 8 is a flow chart of an example method of monitoring translation buffers to detect violations relating to executable pages in a memory.

FIG. 8 is a flow chart of an example method 800 of performing a monitoring of translation buffers to detect violations relating to executable pages of memory. For example, method 800 may be performed by a hardware monitor, such as hardware monitor 116 of FIG. 1 and/or hardware monitor 316 of FIG. 316 utilizing conflict detection engines, such as conflict detection engines 330 of FIG. 3. At 802, the method includes detecting, with a monitor embedded on computing hardware, a conflict between a designation of an attribute of a selected page of memory in one or more translation buffers. As indicated at 804, the conflict may include in some examples detecting two entries in the translation buffers that point to a same physical address in the memory, where a first of the two entries designates an executable attribute for the selected page and a second of the two entries designates a writeable attribute for the selected page.

At 806, the method includes performing a mitigation mechanism in response to the conflict detected at 802. For example, the mitigation mechanism may include any of the mitigation mechanisms described herein, including but not limited to sending an alarm (e.g., to a secure service, which may be external to the computing hardware on which the hardware monitor is embedded), quarantining one or more devices relating to the hardware, and/or any other action.

Figure 9:
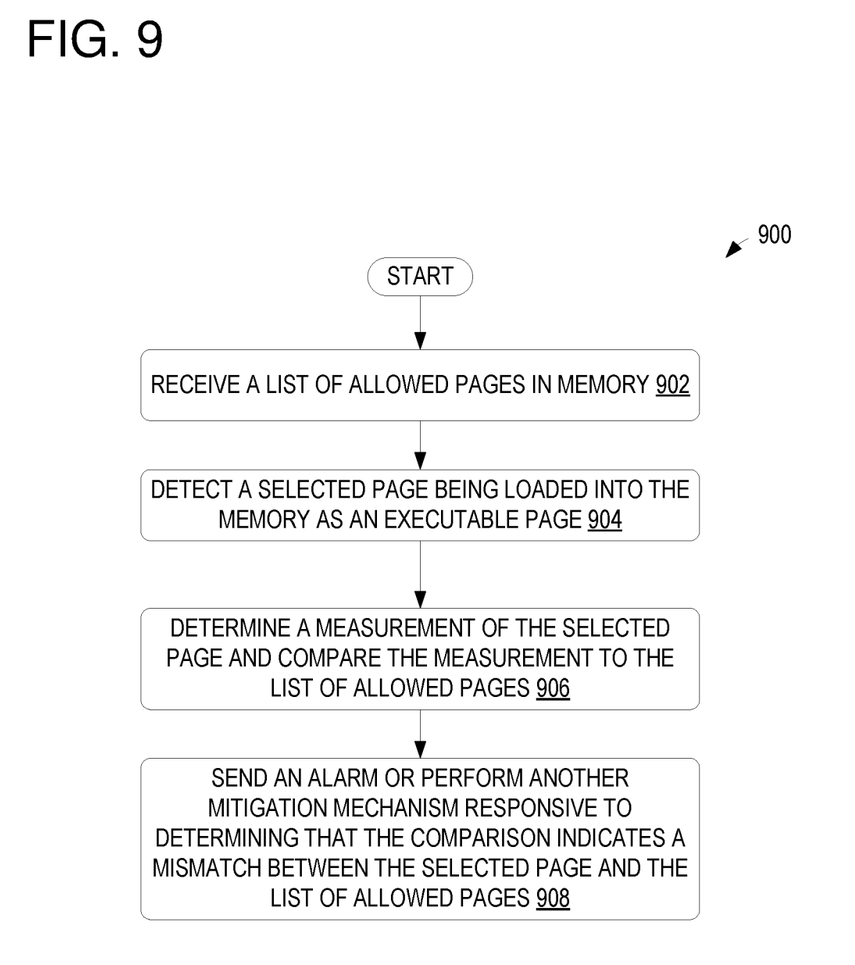
FIG. 9 is a flow chart of an example method of performing measurements of executable pages to detect violations relating to the executable pages in a memory.

FIG. 9 is a flow chart of an example method 900 of performing measurements of executable pages to be loaded into memory to determine violations relating to the pages. For example, method 900 may be performed by a hardware monitor, such as hardware monitor 116 of FIG. 1 and/or hardware monitor 316 of FIG. 316 utilizing measurement engines, such as measurement engines 332 of FIG. 3 and related components. At 902, the method includes receiving a list of allowed pages in memory. For example, as described above with respect to FIGS. 1 and 3, a list of allowed pages may be provided by a secure service and/or updated when applicable.

At 904, the method includes detecting a selected page being loaded into memory as an executable page. At 906, the method includes determining a measurement of the selected page and comparing the measurement to the list of allowed pages. As described above, the measurement may include a hash of the selected page. The list of allowed pages may also include hashes of the allowed pages, allowing for a direct comparison to determine whether the measurement (e.g., hash) of the selected page is included in the list (e.g., matches an entry in the list).

At 908, the method includes sending an alarm or performing another mitigation mechanism responsive to determining that the comparison indicates a mismatch between the selected page and the list of allowed pages. For example, the alarm/mitigation mechanism may include any of the mitigation mechanisms described herein, including but not limited to sending an alarm (e.g., to a secure service, which may be external to the computing hardware on which the hardware monitor is embedded), quarantining one or more devices relating to the hardware, and/or any other action.

Figure 6:
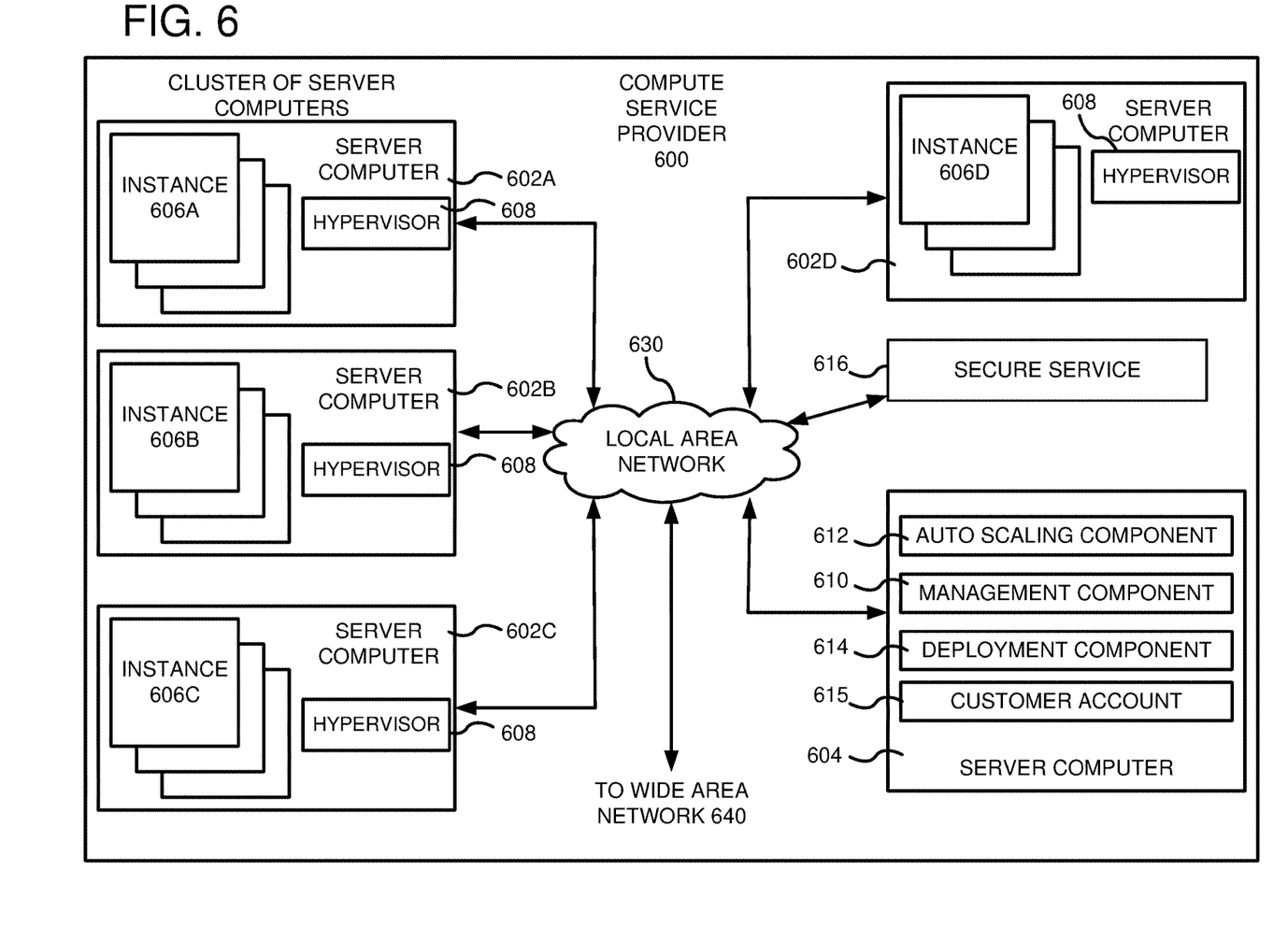
FIG. 6 is an example system diagram showing a plurality of virtual machine instances running in the multi-tenant environment.

FIG. 6 is a computing system diagram of a network-based compute service provider 600 that illustrates one environment in which embodiments described herein can be used. For example, the compute service provider 600 may be coupled to and/or include devices having hardware monitors for monitoring executable pages as described above. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of users operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

In some implementations of the disclosed technology, the computer service provider 600 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A user can access the management component 610 to configure various aspects of the operation of the instances 606 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 612 can scale the instances 606 based upon rules defined by the user. In one embodiment, the auto scaling component 612 allows a user to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist users in the deployment of new instances 606 of computing resources. The deployment component can have access to account information associated with the instances, such as who is the owner of the account, credit card information, country of the owner, etc. The deployment component 614 can receive a configuration from a user that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the user-provided configuration and cache logic to configure, prime, and launch new instances 606. The configuration, cache logic, and other information may be specified by a user using the management component 610 or by providing this information directly to the deployment component 614. The instance manager can be considered part of the deployment component.

User account information 615 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc. A secure service 616 may be in communication with one or more hardware monitors executing on network interface controllers or other components of devices in the multi-tenant environment. For example, secure service 616 may be an example of secure service 122 of FIG. 1, and may be configured to receive alerts and/or data from the hardware monitors corresponding to potential violations relating to executable pages of memory, as described above with respect to FIGS. 1-4.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
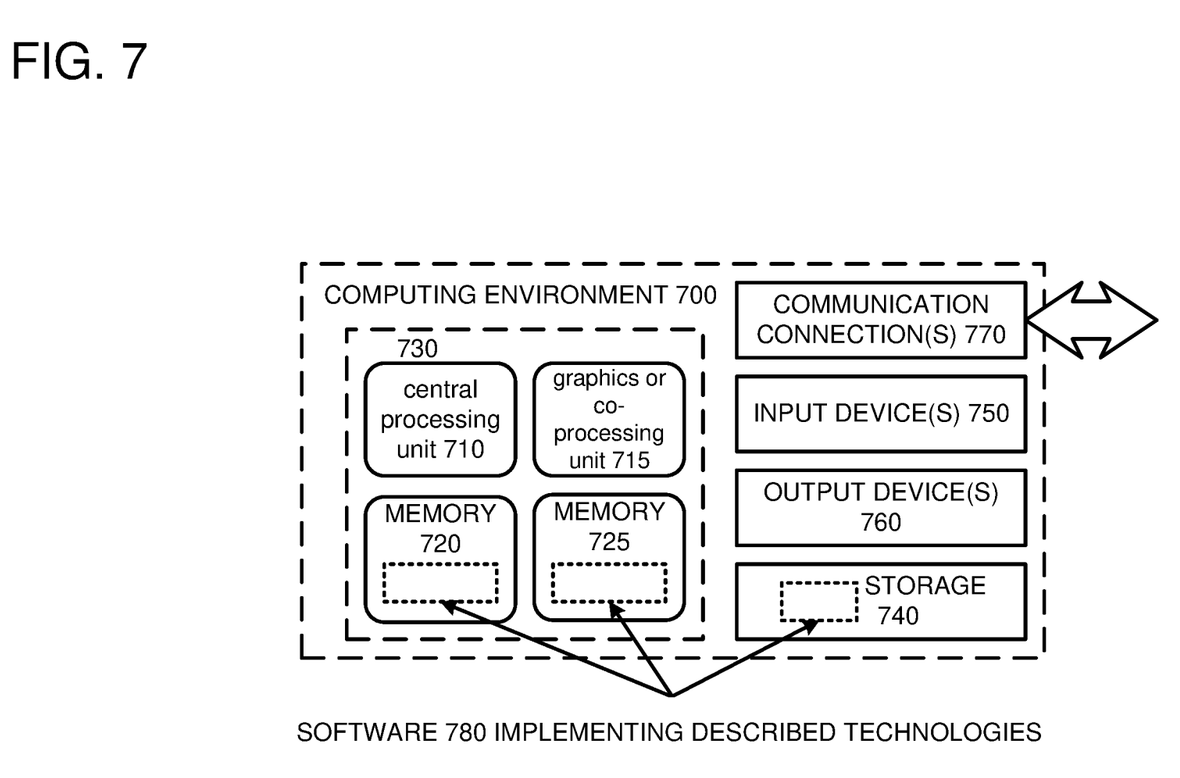
FIG. 7 depicts a generalized example of a suitable computing environment in which the described innovations may be implemented.

FIG. 7 depicts a generalized example of a suitable computing environment 700 in which the described innovations may be implemented. For example, the hardware monitors described above (e.g., hardware monitors 116 of FIG. 1 and/or hardware monitors 316 of FIG. 3) may be included in a device comprising one or more of the components of computing environment 700. In additional or alternative examples, a secure service (e.g., secure service 122 of FIG. 1) configured to perform operations relating to results of the page monitoring performed by the hardware monitors described above may include and/or be included in a computing environment such as computing environment 700. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. For example, the hardware DMAs 110 and/or CPU cores 112 of FIG. 1 and CPU 332 of FIG. 3 may be examples of processing units 710, 715. Measurement engines 332 and conflict detection engines 330 of FIG. 3 may be additional examples of processing units 710, 715 in some examples. One or more of the operations of methods 200, 400, and/or 500 of FIGS. 2, 4, and 5, respectively, may be performed by a processing unit such as processing units 710, 715. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). In some examples, one or more of the memory components described above (e.g., memory 106 of FIG. 1, memory 306, mappings memory 328, and/or measurement reference list 334 of FIG. 3) may correspond to memory 720 and/or memory 725. In other examples, the above-referenced memory components may be included in the computing environment in addition to memory 720 and/or 725.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein. In some examples, one or more of the memory components described above (e.g., memory 106 of FIG. 1, memory 306, mappings memory 328, and/or measurement reference list 334 of FIG. 3) may correspond to storage 740. In other examples, the above-referenced memory components may be included in the computing environment in addition to storage 740.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer system comprising:
   first memory for storing executable instructions, the executable instructions including first instructions for an application stored in a page of the first memory having an associated attribute; and
   a system-on-chip (SoC) including a first processing component and a hardware monitor comprising a second processing component, the first processing component configured to communicate with the first memory and execute the executable instructions on the first memory, the second processing component configured to execute second instructions to:
      monitor memory operations for the first processing component relating to the page of the first memory, including loading contents of one or more translation buffers for the first processing component into a mappings memory and operating a plurality of computing processing units in parallel to execute the second instructions to compare attribute designations for page references in the one or more translation buffers, and
      responsive to detecting, based on the monitoring of the memory operations, a conflict between respective designations of the attribute of the page of the first memory in respective entries in the one or more translation buffers of the first processing component, performing an operation to mitigate the conflict, the operation including issuing an alert to an external secure system indicating information relating to the conflict.

2. The computer system of claim 1, wherein the conflict comprises the attribute of the page of the first memory being designated as executable in a first entry of the one or more translation buffers pointing to a physical address of the page in the first memory and designated as writeable in a second entry of the one or more translation buffers pointing to the physical address of the page in the first memory.

3. The computer system of claim 1, wherein the conflict further comprises a designation of the page as writeable in an entry corresponding to the page in the one or more translation buffers and a designation of the page as executable in the first memory, or vice versa.

4. The computer system of claim 1, wherein the first processing component comprises a plurality of cores and wherein the one or more translation buffers are each respectively associated with a corresponding one of the plurality of cores.

5. The computer system of claim 1, further comprising a tracer including a buffer for storing logs of commands or logs of instructions sent from the first processing component to the first memory, and wherein, responsive to detecting the conflict, the second processing component is further configured to execute instructions to freeze the buffer, extract logs relating to the conflict, and transmit the extracted logs to a control plane for analysis to determine a cause of the conflict.

6. A method comprising:
detecting, with a monitor comprising a first processing component embedded in computing hardware executing instructions to monitor memory operations in the computing hardware, a conflict between respective designations of an attribute of a selected page of a memory of the computing hardware in one or more translation buffers used by a second processing component of the computing hardware, wherein the conflict comprises two entries in the one or more translation buffers that point to a same physical address of the memory corresponding to the selected page, where a first entry of the two entries designates an executable attribute for the selected page and a second entry of the two entries designates a writeable attribute for the selected page; and
performing a first mitigation mechanism to mitigate the conflict in response to detecting the conflict, wherein the first mitigation includes intercepting a violating command or instruction to prevent a requested change to an attribute of the selected page or quarantining the computing hardware.

7. The method of claim 6, wherein the first mitigation mechanism includes quarantining the computing hardware until an auditing process is complete and further includes sending an alarm to an event logger, wherein quarantining the computing hardware includes one or more of freezing the memory, not allowing one or more executable pages in the memory to run, or preventing the computing hardware from accessing a network.

8. The method of claim 7, wherein the event logger is included in a secure service outside of the computing hardware.

9. The method of claim 7, wherein the auditing process comprises freezing a buffer for a tracer associated with the monitor, extracting logs of commands or logs of instructions sent from the second processing component of the computing hardware to the memory and relating to the conflict, and sending the extracted logs to an external secure service for analysis to determine a cause of the conflict.

10. The method of claim 6, further comprising:
detecting, with the first processing component executing instructions, an executable page being loaded into the memory,
comparing a measurement of the executable page to a list of allowed pages for the memory, and
performing a second mitigation mechanism responsive to determining a mismatch between the measurement of the executable page and the list of allowed pages.

11. The method of claim 10, wherein one or both of the first mitigation mechanism and the second mitigation mechanism comprises sending an alarm to an external service.

12. The method of claim 6, wherein detecting the conflict further includes detecting a command or instruction sent from the second processing component to the-memory requesting an unauthorized change in the attribute.

13. The method of claim 12, wherein the second processing component includes a core of a central processing unit.

14. An integrated circuit comprising:
a first processing component, the first processing component configured to communicate with a first memory for storing first executable instructions; and
a hardware monitor embedded in the integrated circuit, the hardware monitor comprising a mappings memory and a second processing component comprising one or more computing processing units configured to execute second instructions to:
load contents of one or more translation buffers into the mappings memory;
detect a conflict relating to an attribute of an executable page of the first memory based on an analysis of attributes of the executable page in entries of the one or more translation buffers referencing the executable page, wherein the conflict comprises a mismatch in attributes for virtual addresses in the one or more translation buffers that point to a same physical address in the first memory; and
perform a mitigation mechanism to mitigate the conflict in response to the conflict, the mitigation mechanism including sending an alarm to an external secure service indicating the conflict for the executable page, and the mitigation mechanism further including one or more of intercepting an instruction or command to cause the conflict and preventing the instruction or command from reaching the first memory, or quarantining the computing hardware by freezing the first memory, disallowing one or more executable pages in the first memory from running, or preventing the integrated circuit from accessing a network.

15. The integrated circuit of claim 14, wherein the hardware monitor is further configured to audit the conflict by: freezing a buffer for a tracer associated with the hardware monitor, extracting logs for commands or instructions sent from the first processing component to the first memory and related to the conflict, and sending the extracted logs to the external secure service for analysis to determine a cause of the conflict.

16. The integrated circuit of claim 14, wherein detecting the conflict comprises executing the second instructions by a plurality of the one or more computing processing units in parallel to analyze the contents of the one or more translation buffers loaded into the mappings memory.

17. The integrated circuit of claim 16, wherein detecting the conflict comprises identifying a mismatch between attributes designated in different references to the executable page across the one or more translation buffers.

18. The integrated circuit of claim 17, wherein, while the attribute includes a first designation of the executable page as being executable in a first entry of the one or more translation buffers, the conflict comprises the executable page having a second designation in a second entry of the one or more translation buffers indicating that the executable page is writeable, and while the attribute includes the second designation of the executable page as being writeable in the first entry of the one or more translation buffers, the conflict comprises the executable page having the first designation indicating that the executable page is executable in the second entry of the one or more translation buffers.

19. The integrated circuit of claim 18, wherein the first processing component comprises a plurality of central processing units (CPUs) or CPU cores, and wherein each of the one or more translation buffers correspond to an associated respective CPU or CPU core of the plurality of CPUS or CPU cores.

\* \* \* \* \*